INVENTORS
RAYMOND M. PETRUCCI
STEPHEN B. BARMORE
BY
ATTORNEY

INVENTORS
RAYMOND M. PETRUCCI
STEPHEN B. BARMORE
BY
ATTORNEY

United States Patent Office 3,442,390
Patented May 6, 1969

3,442,390
MULTICARTRIDGE FILTER
Raymond Mark Petrucci, Waterbury, and Stephen Barrett Barmore, Southington, Conn., assignors to American Machine & Foundry Company, a corporation of New Jersey
Filed Nov. 27, 1967, Ser. No. 685,859
Int. Cl. B01d 29/26
U.S. Cl. 210—323                 5 Claims

ABSTRACT OF THE DISCLOSURE

A vessel employing a plurality of cartridge-type radial flow filters including means for supporting the cartridges, sealing the ends thereof while permitting axial effluent flow.

---

The present invention relates to improvements in liquid filters and in particular to an improved filtration apparatus for the removal of sediment from water.

It is a prime object of the present invention to provide a device simple in construction and operation having high flow rates for institutional use such as restaurants, schools, hospitals, large homes, etc.

It is an object to provide a device employing a plurality of filtration or cartridges of the types well known in the art so as to obtain a high degree of clarification simultaneous with a high flow rate.

It is another object to provide a device of type herein described adaptable for various liquid treatment operations, i.e., taste and odor removal, in addition to clarification.

It is a further object to provide a device of the type herein described in which improved means are provided for holding, securing and also for removng the filtration elements.

It is a specific object to provide a device of the type herein described in which an improved housing is provided.

In the past various devices have been known for the purpose of clarifying or filtering liquids at high flow rates. Some have employed plural elements or cartridges. Most, however, have been large, cumbersome and complex in operation, maintenance and in the replacement of cartridge elements.

The present invention eliminates the defects and disadvantages found in the prior art and provides a device easy to use, maintain and economical in operation as well as simple and inexpensive to produce. The present device will be useful for the filtration of water, purification of oils, clarification of coolants and any other form of mechanical removal of sediment from liquid.

Reference is made here to copending companion application filed by S. Barmore, entitled "Filters," Ser. No. 685,905, of even date herewith, in which details of a venting device, which may be employed in filters of the type here described, is shown and claimed.

The above enumerated objects and advantages, and others not enumerated will be apparent from the following description and the accompanying drawings in which.

Figure 1:
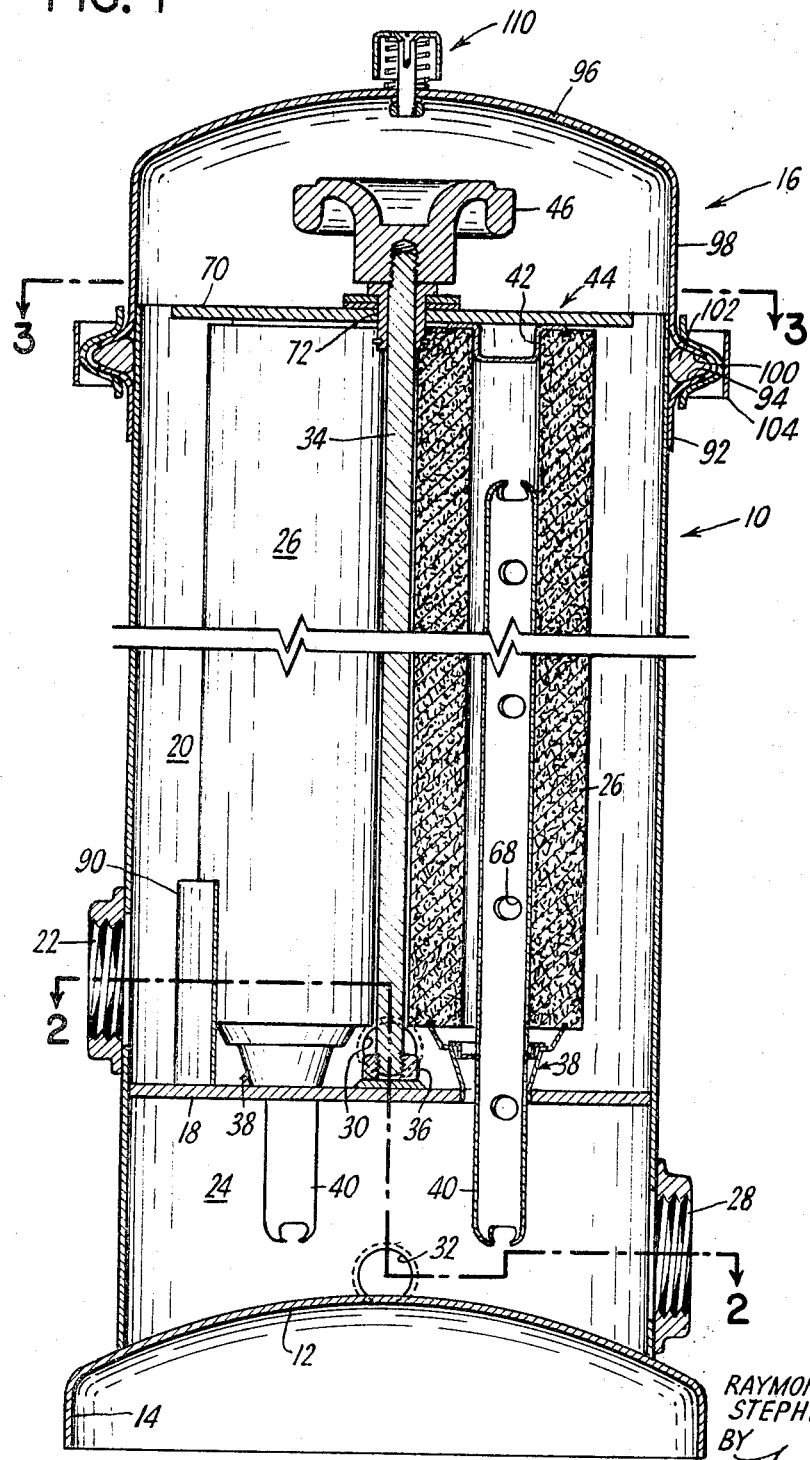
FIG. 1 is a fragmentary part side elevation part vertical sectional view of a device embodying the principles of the present invention.

The following description reference will be made to the use of filter elements or cartridges. In doing so it will be understood that any element or cartridge of a self supporting, radial flow type is meant. These types of cartridges are well known in the art and further description is not required here, however, reference is made to the following patents showing some of the forms such cartridges take: Anderson, 2,539,767; Anderson, 2,539,768; Krogel, 2,802,405; and Goldman, 3,065,856.

In the illustrated embodiment there is shown filtering device comprising a tubular casting 10 having a closed bottom 12 formed in conjunction with a supporting base 14. The casing 10 is provided with a removable cover 16 the details of which will be described later. Extending horizontally across the casing 10 near its lower end is a circular plate sealingly welded to the inner wall of casing 10 to provide a partition 18 dividing the interior of the said casing into two chambers, the upper one, 20, receives raw liquid through inlet part 22 and the lower chamber 24 receives clean liquid, which has passed through filter elements 26, from the exterior to the interior thereof, for exit via outlet part 28; these parts (22 and 28) together with clean out parts 30 and 32, preferably consist of commercially available spuds welded in place and having internal pipe threads. A holddown stud or rod 34 is threaded at each end and at its lower-end is carried in a nut 36 welded to the center of partition 18.

Broadly outlined, the interior structure of the device here disclosed has eight filter elements 26, arranged in a ring of four pairs of axially stacked filter elements. The subject elements take the well known form of foraminous thick-walled tubes adapted for fluid to flow from the outside to the inside and thence, axially, in a desired direction, which here is through one of a respective number of openings in partition 18 to the clean fluid chamber 24. Each stack of filter elements is carried in a hollow pedestal 38, affording entry to the chamber 24, and is aligned, element with element and with the said pedestal, by an inner hollow post 40. The upper ends of the filter element stacks engage the seal plates 42, that are part of the pressure plate assembly 44. A nut 46 engages the upper thread of rod 34 and, as will be later described in detail urges the said pressure plate assembly toward the partition 18 and so places the seal plates 42, filter elements 26, and pedestals 38 under compressive axial loading.

Figure 4:
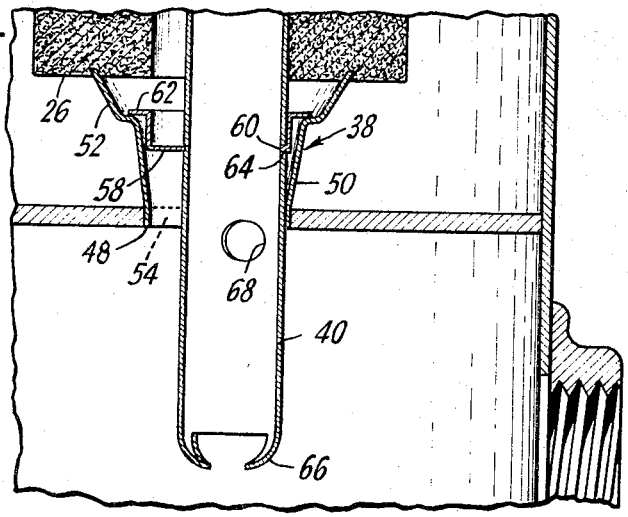
FIG. 4 is an enlarged view of the lower portion of parts shown in FIG. 1.

Going now to greater detail; the pedestals 38 as seen in FIG. 4 are preferably made of sheet metal, they have a substantially parallel walled lower section 48 whose inner diameter closely approximates the inside diameter of the elements 26, the walls then extend axially and radially for a suitable distance and, spreading outwardly, form a flange 50 having an axially and radially flaring lip 52 which is suited for penetrating engagement with the end of an element 26, to afford a seal against the leakage of liquid at this point. The said lower portion 48 enters and may pass through a suitable hole 54 (one of a plurality) in partition 18 where it is secured by expanding, in boiler tube fashion, for fluid-tight engagement therewith; the enlarging diameter above the portion 48 limits passage through the said partition. As may be seen by referring to FIG. 1 the pedestals 38 are arranged and proportioned to raise the lowest part of the filter elements above the bottom of the chamber 20 and the cleanout part 30 so as to be clear of any accumulation of sludge.

Figure 2:
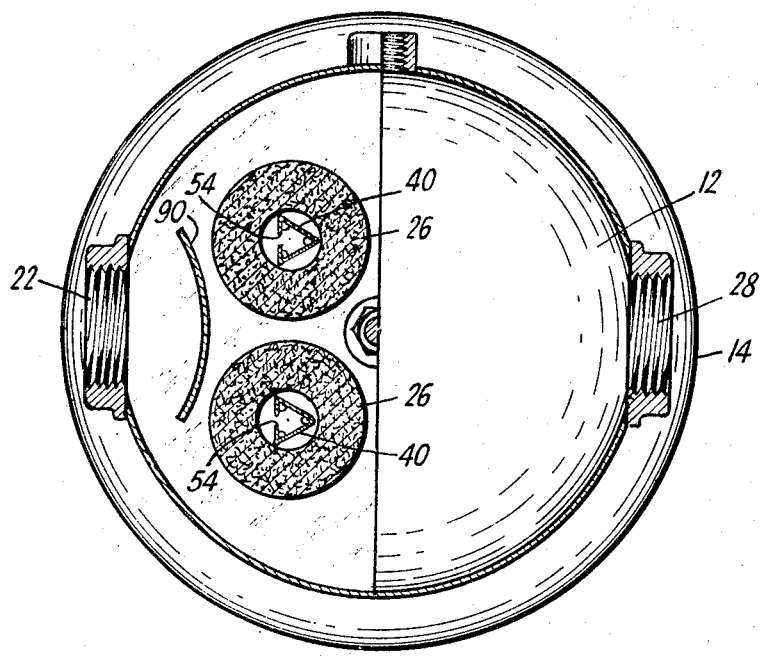
FIG. 2 is a sectional view of the device of FIG. 1 taken along line 2—2 thereof.

The hollow posts 40 are most conveniently made of sheet metal in the shape of a triangular cross-section tube having an open joint 54 (see FIG. 2) and an effective diameter almost equal to the inside diameter of the filter elements and the lower portion 48 of the pedestal 38. Each post, 40, carries a cup-shaped stop 58, having a perforated bottom with an inwardly protruding lip 60 affording a hold slightly smaller than the effective diameter of post 40, said stop 58 further having an outturned flange 62 suited for engagement with the flange 50 of pedestal 38. The corners of the posts 40 are slotted as at 64 wherever it is desired to secure the stop 58 which may be placed in its required position by squeezing inwardly the split post to permit passage of the lip 60 to the point where, when the post is allowed to expand, it enters with locking engagement into the slots 64. The ends of the posts 40 are, at the corners, preferably deformed inwardly as at 66 to avoid the possibility of abrading the inner wall of the element 26. The posts are also pierced as at 68 with a suitable series of holes to facilitate the flow of liquid.

Figure 3:
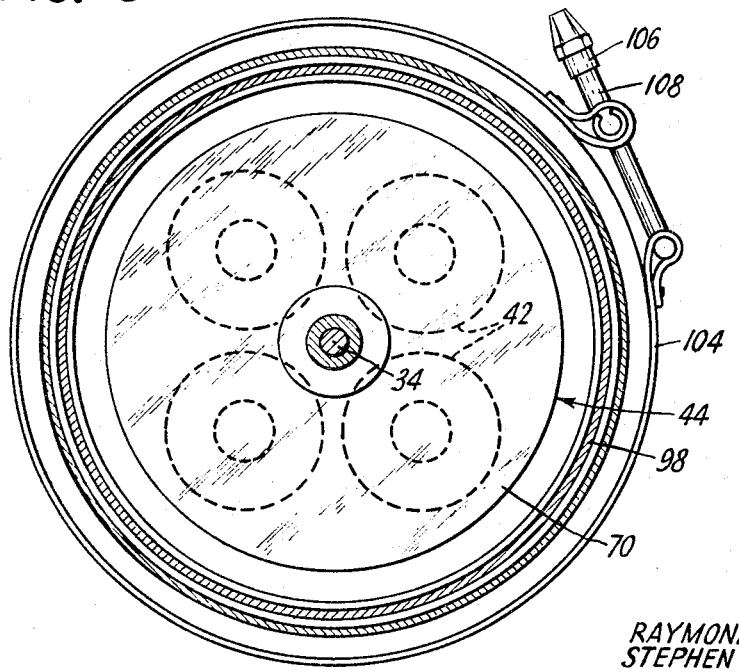
FIG. 3 is a sectional view taken along line 3—3 of FIG. 1.
Figure 5:
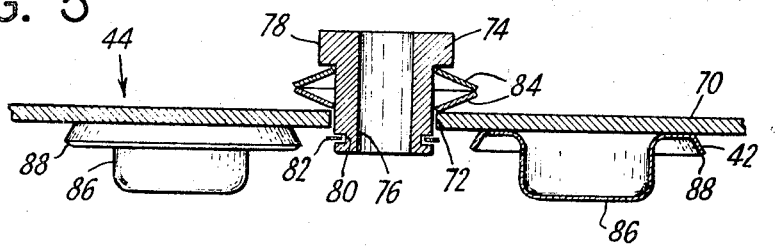
FIG. 5 is a cross sectional view of the pressure plate assembly comparable to a similar view in FIG. 1 but showing details when not under compressive loads.

Considering next the pressure plate assembly 44; this assembly as seen in detail in FIGS. 3 and 5 comprises a relatively heavy metallic disc 70, having a central aperture 72; it further comprises a series of seal plates 42 secured by welding or other convenient means to said disc; a bushing 74, has a central bore 76 adapted to slide freely on rod 34 and a cylindrical body portion shaped for a slip fit in aperture 72; it also has a flange 78 and is grooved at 80 to receive and hold a snap ring 82 located on the lower side of the disc 70. On the upper side, a pair of Belleville springs 84 of conventional frustoconical shape oriented base to base are provided. The seal plates 42 are arranged on disc 70 to face the pedestals 38 and are conveniently made of sheet metal with a central hub portion 86 sized for a slip fit inside the filter elements 26 (see FIG. 1). Surrounding the said hub portion is a flat flange with a downwardly and radially extending lip 88 of substantially the same size as the similar lip 52 of pedestal 38 and the function of lips 88 is identical with that of lip 52.

When the above described components are to be assembled in the casing 10, the posts 40 with their stops 58 in place, are passed through pedestals 38 until arrested by the said stops, which in conjunction with the close fit of the posts in the lower part of said pedestals holds them, the posts, upright. The filter elements are then stacked two high on each of the said posts and the pressure plate assembly 44 is next placed on the waiting parts with the rod 34 passing through bushing 74 and with the seal plates 42 engaging the filter elements as shown in the drawings. Nut 46 is next applied to rod 34 and tightened so that Belleville springs 84 are substantially flattened and the seal lips 52 and 88 penetrate the ends of the filter elements. The internal parts are in position and ready for use. If later, the filter elements yield slightly to any of the influence which may affect them, such as heat, fluid pressure, etc., the Belleville springs will expand axially so to maintain a compressive load on seals, etc., and avoid bypassing. The Belleville springs will, as is obvious, compensate and maintain a compressive load even under uneven expansion of the cartridge by permitting the plate assembly 44 to rock about the rod 34.

It may be pointed out here that the upstanding baffle 90 which is secured to partition 18 serves to deflect incoming fluid to prevent direct impingement on the filter elements.

Reference is now made to the relationship of casing 10 with cover 16 and the constructional features involved. The casing 10 is conveniently made tubular in form and has near, but below, its open end an encircling band 92 which may be welded in place and has a radially and axially extending lip portion 94. The cover 16 is preferably formed of sheet metal with a domed head 96, and a cylindrical portion 98 sized to slide on the upper part of casing 10 and terminating in a lip 100 of substantially the same shape and size as the lip 95; these lips in co-operation with the wall of casing describe annulus of roughly triangular cross-section in which is lodged a resilient elastomeric gasket 102. An encircling V section and commercially available clamp 104 encircles the lips 94 and 100 and when nut 106 is tightened on bolt 108 the clamp presses the cover 16 down on to casing 10 and compresses gasket 102 so as to afford a pressure tight joint in the well known manner.

The operation of fluid handling devices having a bell-shaped housing such as the one here disclosed, commonly involves an apparently simple problem, that of venting entrapped air which is the cause of many annoyances. Pet corks, globe valves, gasketed vent plugs and ordinary pipe plugs, all having pressure tight threaded joints and carefully machined surfaces are among the numerous devices employed, but all are objectionable on account of high cost, need of tools to operate, liability to leakage and so forth.

A novel simple and reliable venting device 110 which evades the prior art problems is employed in the present construction. It comprises six very simple parts, viz., a spring, a nut, a flat head machine screw, a commercially available ferrule, an ordinary O-ring and a stem, if desired the nut can be eliminated by modifying the shape of the stem; no pressure tight screw threads are used nor are any carefully machined sealing joints employed.

Attention is directed to the aforementioned companion application of S. Barmore for complete details of the venting device and its content are incorporated here by reference.

The preceding specifications have covered the constructions shown in FIGS. 1 to 5 inclusive. However there may be some cases where it is highly desirable to raise the inlet for filtered liquid, into chamber 24 to a level much higher than both the pedestals 38 and the upper edge of casing 10 so that there is no danger of dirt passing to the clean side of the filter when elements are being changed and so that the whole interior of chamber 20 may readily be cleaned and scrutinized.

Figure 6:
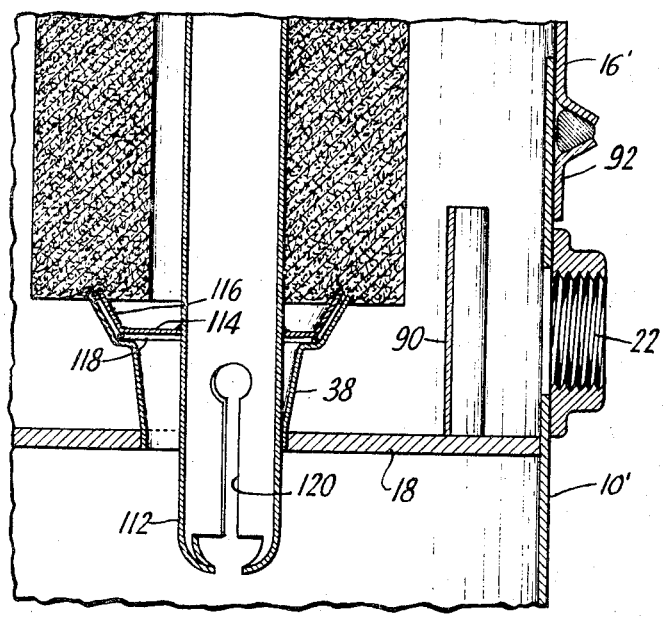
FIG. 6 is similar to the lower right hand portion of FIG. 1 but shows some modifications of structural details.

The construction shown in FIG. 6 illustrates a simple mode of achieving the above mentioned ends. Here the casing, designated 10' is reduced to the lowest height that will accommodate the inlet part 22 and the band 92. The cover 16' is correspondingly increased in height so that the overall height of the complete structure is unchanged. There is no change in the pedestals 38 and the partition 18 but the earlier described posts 40 and their stops 58 are discarded. The post 40 is replaced by a seamless triangular cross-sectional tubular post 112 of the same general dimensions as port 40 and stop 50 is replaced by a shallow cup 114 apertured to fit the post 112 and preferably welded or brazed thereon to afford a fluid tight joint. The said cup has a flaring rim 116 proportioned to fit in the top of pedestal 38 and is sealed relative thereto by an O-ring 118 which is placed under compression by contact of the rim 116 with the lower end of filter element 26. The lower part of the post 112 which lies below cup 114 is preferably split longitudinally, as shown for example at 120, and deformed slightly outwardly to a larger effective diameter than the balance of the post to afford a force-fit into the lower portion of the pedestal 38.

What is claimed is:
1. A filter comprising a vertical vessel, a transverse wall dividing said vessel into two chambers, the upper chamber having inlet means for feeding liquid to be filtered therethrough, the lower chamber having outlet means for discharging said fluid after filtration, a rod having one end secured to said wall centrally thereof and extending vertically through said upper chamber, said wall having a plurality of openings symmetrically disposed about said rod to permit communication between each of said chambers, a tubular filter element adapted for radial filtering flow of liquid therethrough associated within the upper chamber with each of said wall openings, each of said filter elements being supported at its lower end by said wall and having its interior passage aligned with said wall opening for axial flow of liquid therethrough, means for sealing the upper end of said filter elements against by-passing flow of liquid comprising a transversely extending plate mounted on said rod and adapted to overlie the upper ends of said filter elements, with a seal member having an annular ridge adapted to be compressed into the end of said filter elements and a central hub adapted to fit within the interior passage of said filter element and resilient thrusting means removably secured to the free end of said rod for axially imposing a continuous compressive load on said plate to thereby seal the ends and the interior of said filter elements relative to said plate and said wall under changes in use.

2. The device according to claim 1 wherein said thrusting means comprise a pair of concave spring washers placed in opposed relationship above said plate and an adjustable pressure means for comprising said spring washers against said plate.

3. The device according to claim 1 wherein said thrusting means comprise a Belleville spring assembly mounted on said rod above said plate and a knob threaded to the free end of said rod adjustable to compress said Belleville assembly into said plate.

4. The device according to claim 1 including pedestal means for supporting each of said filter elements above the wall of said upper chamber, said pedestal including means for sealing the ends of said element and the wall opening against bypassing flow of fluid.

5. The device according to claim 1 including means for supporting said filter elements comprising an elongated rod having a plurality of holes therein extending through the center of said element and through said wall opening.

References Cited

UNITED STATES PATENTS

| | | | |
|---|---|---|---|
| 2,773,602 | 12/1956 | Sylvester | 210—323 X |
| 2,904,184 | 9/1959 | Daley et al. | 210—323 |
| 2,936,805 | 5/1960 | Rice | 151—38 |
| 3,118,837 | 1/1964 | Briggs | 210—232 |

REUBEN FRIEDMAN, *Primary Examiner.*

J. L. DE CESARE, *Assistant Examiner.*

U.S. Cl. X.R.

210—352, 436